US012322240B2

(12) United States Patent
Bernard et al.

(10) Patent No.: US 12,322,240 B2
(45) Date of Patent: *Jun. 3, 2025

(54) MECHANICAL WHEEL WITH ROTATABLE MECHANICAL BEZEL

(71) Applicant: LNW Gaming, Inc., Las Vegas, NV (US)

(72) Inventors: Vernon Bernard, Las Vegas, NV (US); Karl Wudtke, Henderson, NV (US); Benjamin E. Isaac, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/981,521

(22) Filed: Nov. 7, 2022

(65) Prior Publication Data

US 2023/0064283 A1 Mar. 2, 2023

Related U.S. Application Data

(63) Continuation of application No. 17/098,581, filed on Nov. 16, 2020, now Pat. No. 11,532,201, which is a continuation of application No. 16/290,600, filed on Mar. 1, 2019, now Pat. No. 10,846,978.

(51) Int. Cl.
*G07F 17/32* (2006.01)
*G07F 17/34* (2006.01)

(52) U.S. Cl.
CPC ...... *G07F 17/3213* (2013.01); *G07F 17/3216* (2013.01); *G07F 17/34* (2013.01)

(58) Field of Classification Search
CPC ... G07F 17/34; G07F 17/3216; G07F 17/3213
See application file for complete search history.

(56) References Cited

U.S. PATENT DOCUMENTS

| | | | |
|---|---|---|---|
| 4,184,683 | A | 1/1980 | Hooker |
| 4,433,844 | A | 2/1984 | Hooker et al. |
| 5,584,763 | A | 12/1996 | Kelly et al. |
| 5,848,932 | A | 12/1998 | Adams |
| 5,882,261 | A | 3/1999 | Adams |
| 6,089,978 | A | 7/2000 | Adams |
| 6,162,121 | A | 12/2000 | Morro et al. |
| 6,224,483 | B1 | 5/2001 | Mayeroff |
| 6,334,814 | B1 | 1/2002 | Adams |
| 6,517,433 | B2 | 2/2003 | Loose et al. |
| 6,561,512 | B2 | 5/2003 | Luciano et al. |
| 6,605,000 | B2 | 8/2003 | Adams |
| 6,663,488 | B1 | 12/2003 | Adams |
| 6,712,694 | B1 | 3/2004 | Nordman |
| 6,827,646 | B2 | 12/2004 | Adams |
| 6,942,571 | B1 | 9/2005 | McAllister et al. |
| 7,179,169 | B2 | 2/2007 | Beaulieu et al. |
| 7,204,754 | B2 | 4/2007 | Gray et al. |

(Continued)

*Primary Examiner* — Reginald A Renwick

(57) ABSTRACT

Disclosed are embodiments of an apparatus having a rotatable wheel, a mechanical annular rotatable bezel overlaying at least a portion of the wheel, and an electronic controller, coupled to the bezel. The bezel is rotatable via manual player input to the bezel. The electronic controller determines a rotational motion of the bezel in response to the manual player input to the bezel. The electronic controller further directs rotation of the wheel in accordance with the determined rotational motion of the bezel.

20 Claims, 9 Drawing Sheets

(56) References Cited

U.S. PATENT DOCUMENTS

| | | | |
|---|---|---|---|
| 7,216,867 | B1 | 5/2007 | Luciano et al. |
| 7,226,358 | B2 | 6/2007 | Miller et al. |
| 7,326,112 | B2 | 2/2008 | Nordman |
| 7,425,177 | B2 | 9/2008 | Rodgers et al. |
| 7,442,123 | B2 | 10/2008 | Brill et al. |
| 7,465,230 | B2 | 12/2008 | LeMay et al. |
| 7,473,173 | B2 | 1/2009 | Peterson et al. |
| 7,559,837 | B1 | 7/2009 | Yoseloff et al. |
| 7,594,848 | B2 | 9/2009 | Thomas |
| 7,614,952 | B2 | 11/2009 | Elias |
| 7,674,172 | B2 | 3/2010 | Miltenberger et al. |
| 7,766,329 | B1 | 8/2010 | Kelly et al. |
| 7,823,883 | B1 | 11/2010 | Kelly et al. |
| 7,878,506 | B1 | 2/2011 | Kelly et al. |
| 7,922,175 | B1 | 4/2011 | Kelly et al. |
| 8,142,273 | B2 | 3/2012 | Williams et al. |
| 8,337,314 | B2 | 12/2012 | Waxman et al. |
| 8,502,936 | B2 | 8/2013 | Rasmussen et al. |
| 8,535,141 | B2 | 9/2013 | Rommerdahl et al. |
| 8,535,148 | B2 | 9/2013 | Vallejo et al. |
| 8,613,656 | B2 | 12/2013 | Wudtke et al. |
| 8,622,803 | B2 | 1/2014 | Cuddy et al. |
| 8,622,808 | B2 | 1/2014 | Pececnik et al. |
| 8,622,825 | B2 | 1/2014 | Griswold et al. |
| 8,657,666 | B2 | 2/2014 | Wudtke et al. |
| 8,657,676 | B2 | 2/2014 | Kelly et al. |
| 8,663,009 | B1 | 3/2014 | Pacey et al. |
| 8,715,053 | B2 | 5/2014 | Kelly et al. |
| 8,771,051 | B2 | 7/2014 | Mattice et al. |
| 8,808,094 | B2 | 8/2014 | DeSimone et al. |
| 8,956,215 | B2 | 2/2015 | Iverson et al. |
| 8,956,216 | B1 | 2/2015 | LeSourd et al. |
| 8,974,280 | B2 | 3/2015 | LeSourd |
| 9,218,709 | B2 | 12/2015 | Young |
| 9,336,962 | B2 | 5/2016 | Wudtke et al. |
| 9,613,485 | B2 | 4/2017 | Barragan |
| 9,972,161 | B2 | 5/2018 | Bernard et al. |
| 10,062,237 | B2 | 8/2018 | Devine et al. |
| 2007/0287530 | A1 | 12/2007 | Seelig et al. |
| 2007/0293301 | A1 | 12/2007 | Seelig et al. |
| 2009/0131168 | A1 | 5/2009 | Waxman et al. |
| 2009/0325683 | A1 | 12/2009 | Wudtke et al. |
| 2009/0325684 | A1 | 12/2009 | Wudtke et al. |
| 2009/0325695 | A1 | 12/2009 | Wudtke et al. |
| 2011/0118014 | A1 | 5/2011 | Mitchell et al. |
| 2011/0212774 | A1 | 9/2011 | Wudtke et al. |
| 2012/0122545 | A1 | 5/2012 | Watkins et al. |
| 2012/0122571 | A1 | 5/2012 | DeSimone et al. |
| 2014/0018150 | A1 | 1/2014 | Wells et al. |
| 2014/0194182 | A1 | 7/2014 | Young |
| 2016/0042591 | A1 | 2/2016 | Bernard et al. |
| 2016/0175701 | A1 | 6/2016 | Froy et al. |
| 2016/0180636 | A1 | 6/2016 | David et al. |
| 2017/0053478 | A1 | 2/2017 | Wudtke et al. |
| 2017/0345250 | A1 | 11/2017 | Pececnik |
| 2018/0012441 | A1 | 1/2018 | Pececnik |
| 2018/0108206 | A1 | 4/2018 | Pececnik |
| 2018/0151022 | A1 | 5/2018 | Bernard et al. |

MECHANICAL WHEEL WITH ROTATABLE MECHANICAL BEZEL

RELATED APPLICATIONS

This patent application is a continuation of, and claims priority benefit to, U.S. patent application Ser. No. 17/098,581, filed Nov. 16, 2020, which is a continuation of U.S. patent application Ser. No. 16/290,600 filed Mar. 1, 2019 which is related to U.S. patent application Ser. No. 16/143,156, filed Sep. 26, 2018. The contents of the application Ser. No. 17/098,581, the application Ser. No. 16/290,600, and the application Ser. No. 16/143,156 are hereby incorporated by reference herein in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD OF THE INVENTION

The present invention relates generally to gaming systems, apparatus, and methods and, more particularly, to a mechanical wheel display with a rotatable mechanical bezel device for use in an electronic wagering game machine housing or other related applications.

BACKGROUND OF THE INVENTION

Gaming machines, such as slot machines, video poker machines and the like, have been a cornerstone of the gaming industry for several years. The aesthetics of gaming machines are important for attracting players and improving the overall appearance of machines. Further, there is a continued need for user interfaces that are attractive and intuitive to use. Therefore, there is a continuing need for improving gaming machines to be visually and functionally appealing.

SUMMARY OF THE INVENTION

According to one or more aspects of the present invention, a gaming terminal, gaming cabinet or gaming machine primarily dedicated to playing a casino wagering game includes a housing configured to house gaming components and a display comprising a mechanical wheel display and a rotatable mechanical bezel surrounding the mechanical wheel display to provide both output and input capabilities. The display assembly provides an ornamental feature as well.

Additional aspects of the invention will be apparent to those of ordinary skill in the art in view of the detailed description of various embodiments, which is made with reference to the drawings, a brief description of which is provided below.

DETAILED DESCRIPTION

Figure 1:
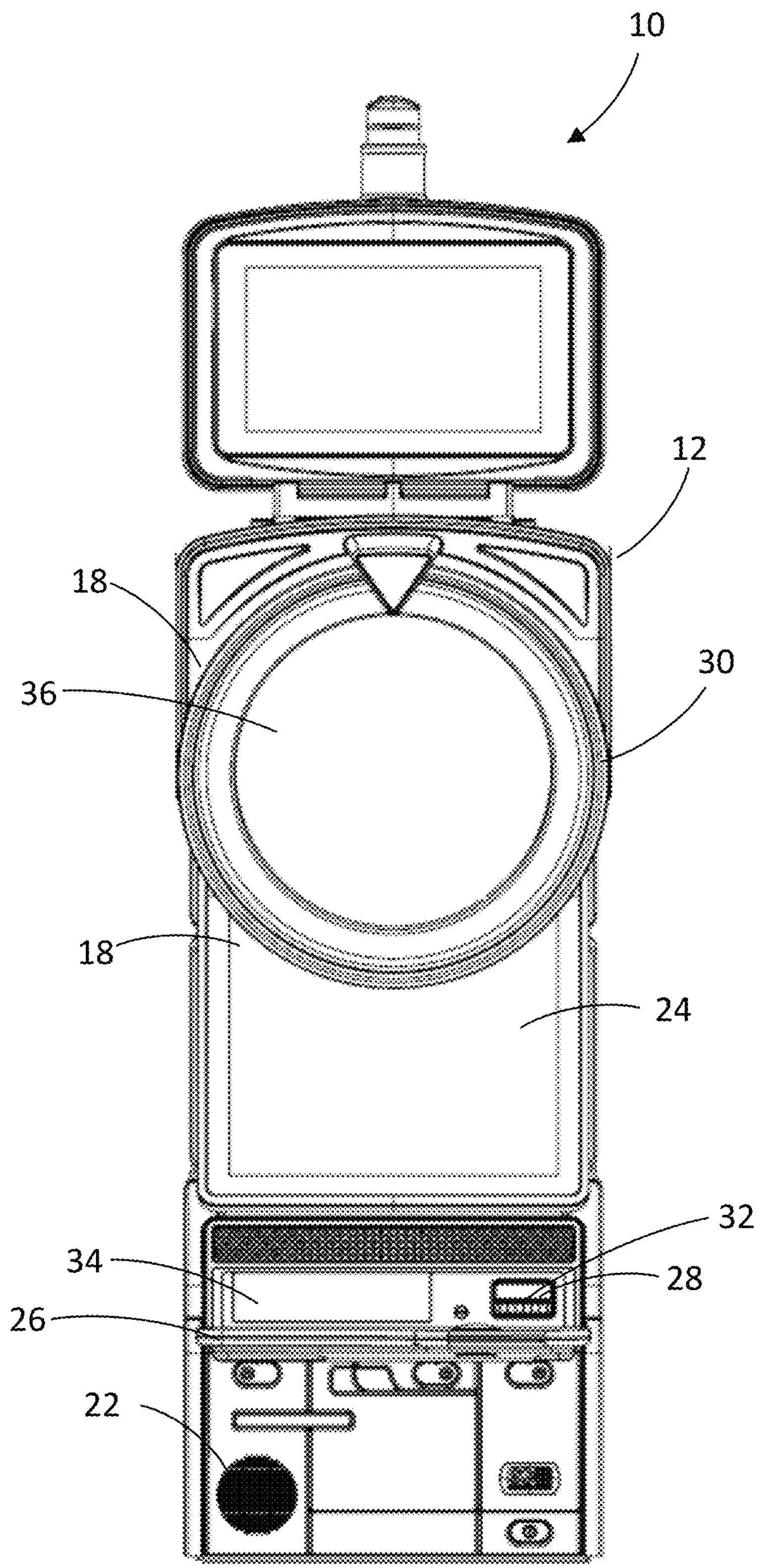
FIG. 1 is an isometric view of a free-standing gaming machine in accordance with one or more embodiments.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking, web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a free-standing gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may or may not be primarily dedicated for use in playing wagering games. An exemplary type of gaming machine is disclosed in U.S. Pat. No. 6,517,433, which is incorporated herein by reference in its entirety.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more doors that are locked and require a physical or electronic key to gain access to the interior compartment of the cabinet 12 behind the locked door(s).

The input devices, output devices, and input/output devices are disposed on, and securely coupled to, the cabinet 12. By way of example, the output devices include a primary display 18, and one or more audio speakers 22. The primary display 18 may be a mechanical-reel display device, a video display device, or a combination thereof in which a transmissive video display is disposed in front of the mechanical-reel display to portray a video image super-imposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary display, a mechanical wheel assembly 36, which may also include a mechanical rotatable bezel ("ring") 30, which serves as an input device. The gaming machine 10 also may include a bill/ticket acceptor 28, a player tracking system panel 34 which may include a card reader/writer, a ticket dispenser 32 (which may be interface with the same input/output slot as bill/ticket acceptor 28, and player-accessible ports (e.g., audio output jack for headphones, video headset jack, USB port, wireless transmitter/receiver, etc.), not shown. It should be understood that numerous other peripheral devices and other elements exist and are readily utilizable in any number of combinations to create various forms of a gaming machine in accord with the present concepts.

The player input devices, such as the touch screen 24, button panel 26, rotatable bezel 30, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. The value input devices are used to deposit cash or credits onto the gaming machine 10. The cash or credits are used to fund wagers placed on the wagering game played via the gaming machine 10. Examples of value input, devices include, but are not limited to, a coin acceptor, the bill/ticket acceptor 28, the card reader/writer, a wireless communication interface for reading cash or credit data from a nearby mobile device, and a network interface for withdrawing cash or credits from a remote account via an electronic funds transfer. The value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
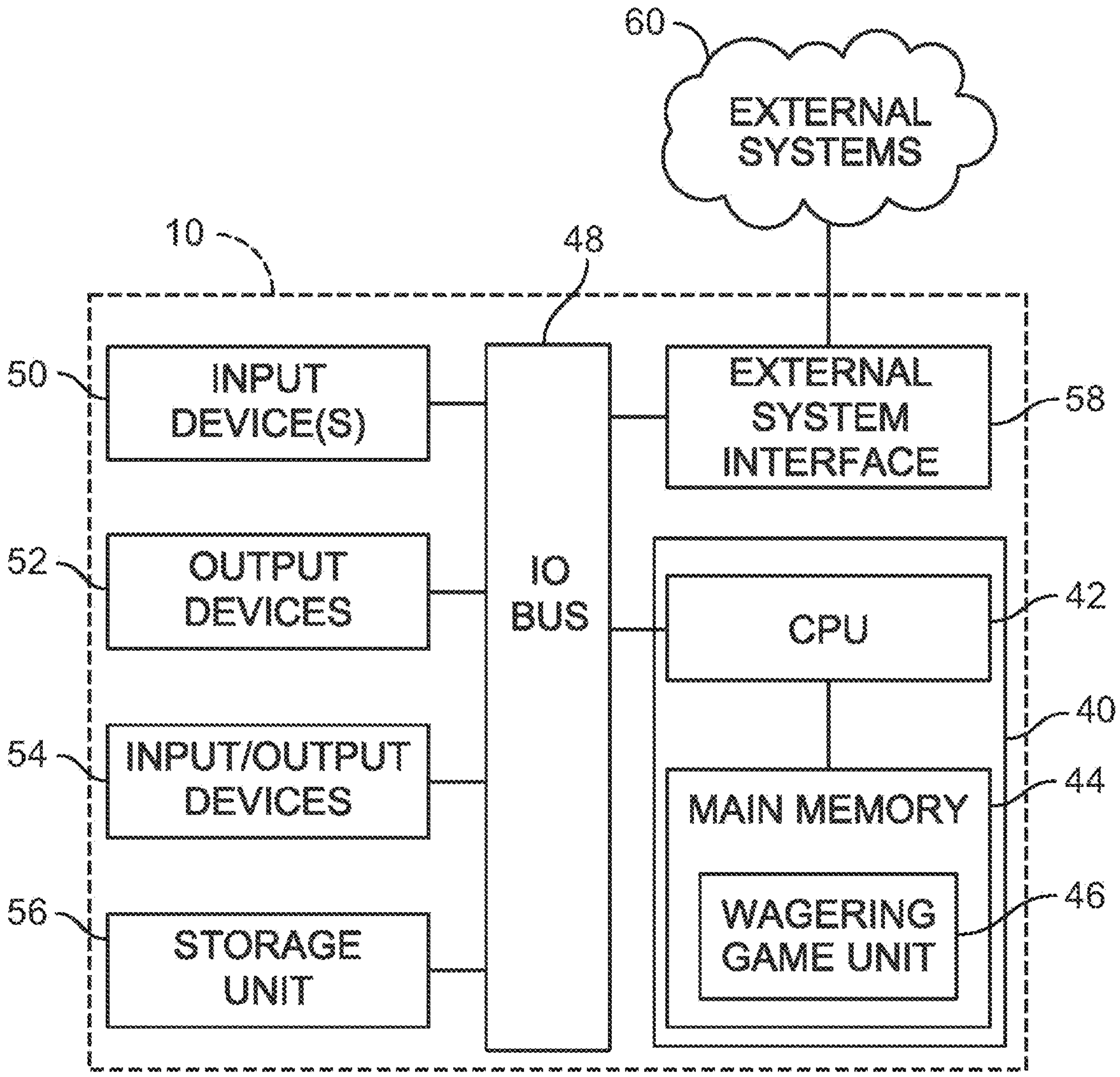
FIG. 2 is a schematic view of a gaming system including the gaining machine.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected, to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compares it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
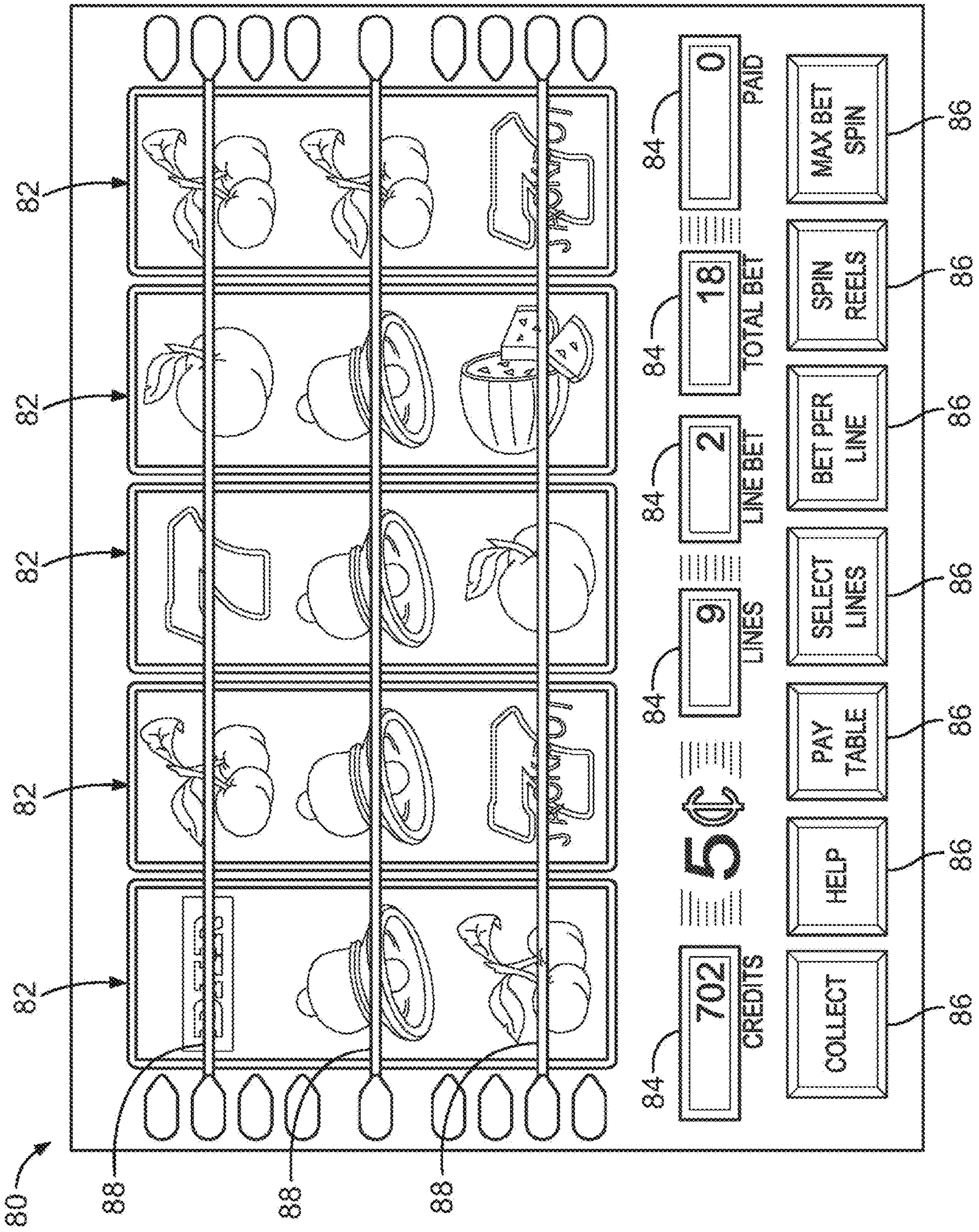
FIG. 3 is an image of an exemplary basic-game screen of a wagering game displayed on the gaming machine.

Referring now to FIG. 3, there is illustrated an image of a basic-game screen 80 adapted to be displayed on the primary display 18 (FIG. 1). The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 (FIG. 2) operates to execute a wagering-game program causing the primary display 18 to display the wagering game.

In response to receiving an input indicative of a wager, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaining Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaining machine 10 may be implemented with hardware and software architectures, circuitry, and other special features that differentiate it from general-purpose computers (e.g., desktop PCs, laptops, and tablets).

A mechanical wheel assembly may be associated with a wagering game playable on the gaming machine. In some embodiments, the mechanical wheel assembly is associated with a base game, and a controller is configured to enable a mechanical annular rotatable bezel (hereinafter, "ring") of the mechanical wheel assembly to be rotatable in response to a triggering condition in the base game so a mechanical wheel (hereinafter "wheel") of the mechanical wheel assembly may be used to determine some or all of an outcome of a secondary or bonus game. In other embodiments, the wheel may be used to determine some or all of an outcome of the base game.

Once a player initiates a spin of the wheel by manually spinning the ring, the controller coordinates speed and direction of the ring with rotation of the wheel to provide the player with the illusion that the ring is directly connected to the wheel and that the player's input to the ring may have some influence on the wheel's outcome. The desired stopping orientation of the wheel is typically predetermined by the RNG, as described above, and sent to a control loop in the logic of the controller. The control loop employs a deceleration profile to ramp down the velocity of the wheel to finally place a particular wheel segment adjacent to a pointer of the mechanical wheel assembly to indicate the final outcome of the wheel spin.

In accordance with one or more embodiments, the mechanical wheel assembly includes the controller, the mechanical wheel coupled to the controller, one or more encoders coupled to the controller and the ring coupled to at least one of the encoders. The ring encompasses at least a portion of the mechanical wheel, a front face of the wheel being visible within the periphery of the ring. The mechanical wheel is typically placed behind transparent glass/plastic, a transmissive display or the like to protect it from player interference.

In accordance with one or more embodiments, the rotation of the ring is coupled to rotation of the wheel by employing a dual motor architecture. A wheel motor is coupled to a shaft on which the rotatable portions of the wheel are mounted. A separate ring motor, which may be a direct current motor, drives a pinion gear, which in turn, drives a large gear connected to the ring, which rides on a circular bearing for free rotation. Both the wheel motor and the ring motor contain an encoder to track their position and velocity. This allows the control loop to rotate the wheel synchronously with the ring by processing inputs from the encoders to produce coordinated outputs to each of the motors. Once the mechanical wheel reaches a certain predetermined velocity, inputs from the ring encoder may be decoupled from the rotation of the wheel, which is then solely decelerated by the controller according to a deceleration profile to come to a stop at a predetermined orientation.

The ring motor may provide resistance to the rotation of the ring. This resistance to the rotation of the ring may include matching the rotational speeds of the ring and the wheel according to the deceleration profile until the mechanical wheel slows to a stop at its predetermined orientation. The ring motor may also brake and simulate heaviness/weight by enacting a "dynamic friction component" to apply various levels of force in an opposite direction to a given current ring direction and proportional to a given current wheel motion. This will be perceived, by the player, as the bezel being more difficult to turn. The motor may also be used to provide resistance so that the ring may be made of a relatively lightweight and inexpensive material, such as chromed plastic, while having the feel of a relatively heavy and expensive material, such as brass. The amount of resistance may also be controlled to provide other feedback to the player. For example, the more the player turns the bezel, the harder it becomes to turn. In one example, the bezel may be "cocked" in one direction or the other. When the player releases the bezel, the ring motor may be used to drive the ring in the opposite direction at a speed proportional to the amount the ring was cocked. The ring and the wheel are then driven in a synchronized manner by their respective motors according to the deceleration curve, as described above.

In other embodiments, the controller detects cessation of the initial manual player input and provides mechanical assistance via the ring motor to prolong the spin of the ring so that is rotation is synchronized with the spin of the mechanical wheel (driven by the wheel motor) for a time period associated with the magnitude of the initial manual player input. In these cases, the controller may adjust the speed of the ring motor to synchronize the rotational speed of the ring with the rotational speed of the mechanical wheel as the mechanical wheel is decelerated according to the deceleration profile. In still other embodiments, the controller may simply decouple the rotational speed of the ring from the rotational speed of the wheel. For example, the controller may detect a tilt condition if the rotation of the bezel is externally slowed subsequent to the end of the initial manual player input. In these cases, the ring motor may be stopped, stopping the rotation of the ring itself, while the mechanical wheel, driven by the wheel motor, independently spins down to its predetermined stopping orientation according to the deceleration profile.

In some embodiments, locking of the ring may be accomplished by the microprocessor electronically signaling the motor to lock. For example, the ring may be locked when unavailable for use as an input device.

Figure 4A:
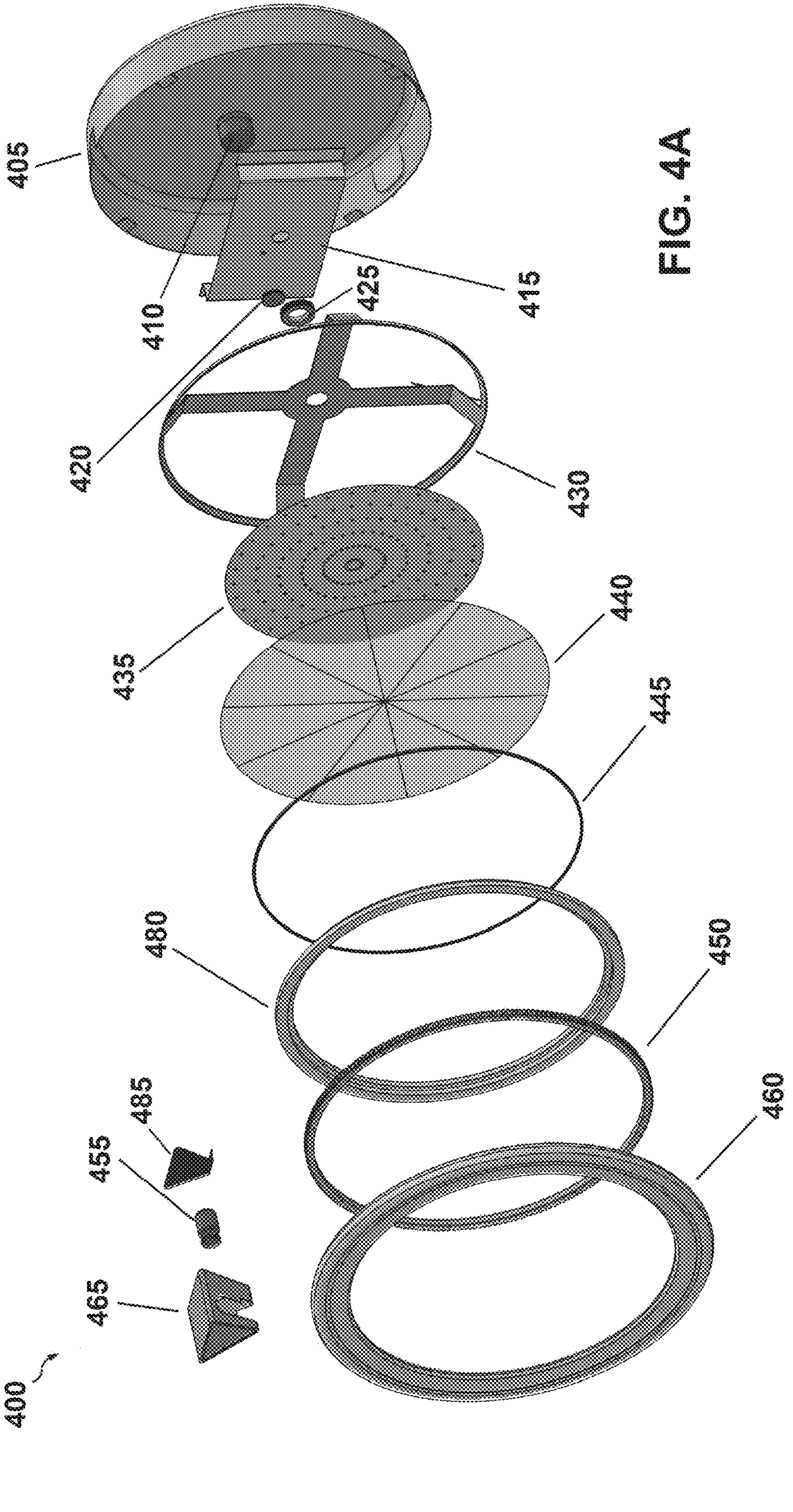
FIGS. 4A and 4B illustrate elements of a mechanical wheel assembly in accordance with one or more embodiments.
Figure 4B:
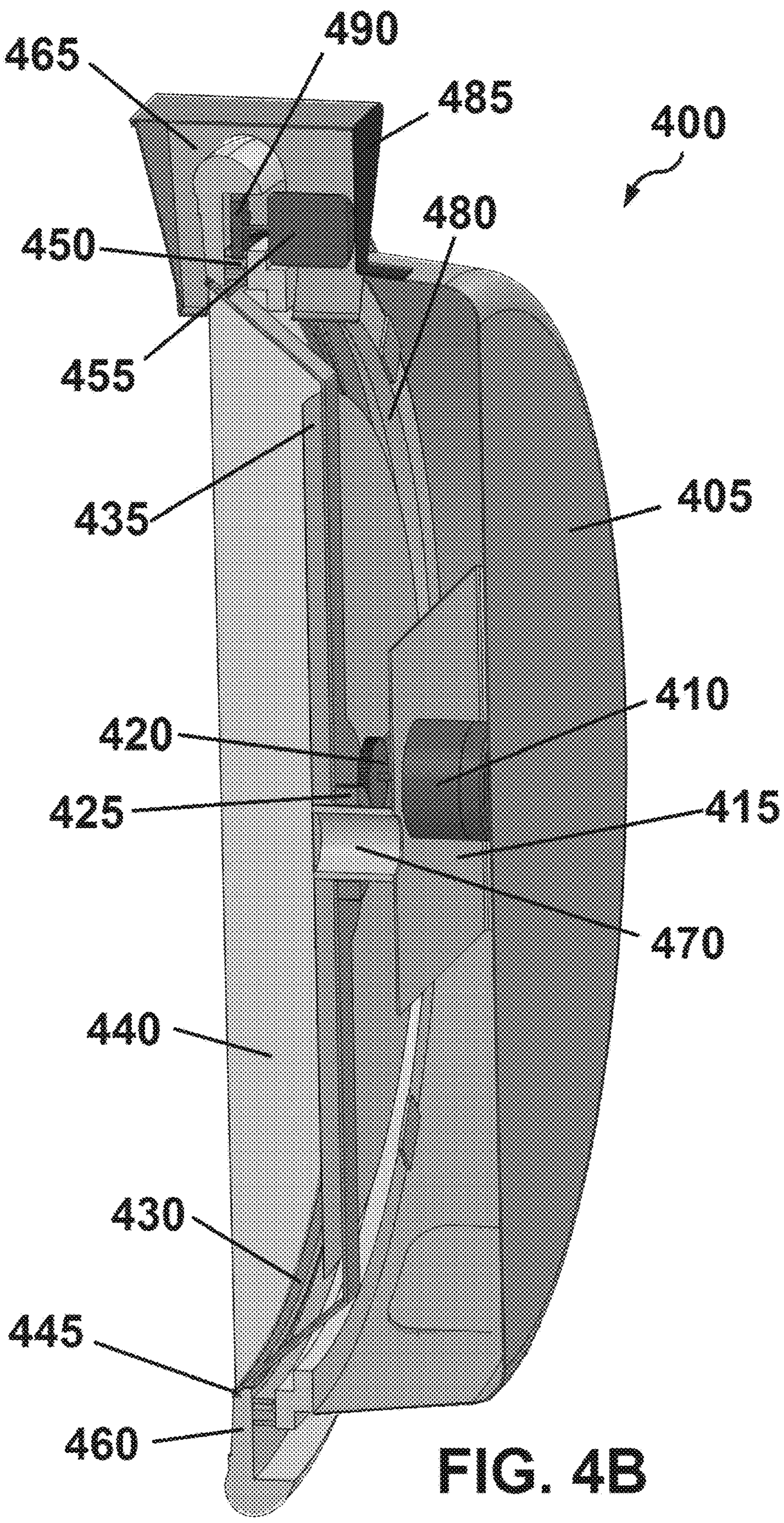

Referring now to FIGS. 4A-4B, wherein like reference numbers denote like or corresponding elements, a mechanical wheel assembly employing a two-motor architecture in accordance with one or more embodiments is shown. The mechanical wheel assembly 400 includes a housing 405 which may be constructed of a material such as metal, fiberglass, plastic, or any similar and suitable material. A bracket 415 made of sheet metal or another suitable material may be mounted into the interior of the housing 405 with fasteners such as screws to provide a mount for a wheel motor 410 attached to the rear of the bracket 415. The drive shaft of the wheel motor 410 extends through a hole in the bracket 415 and a wheel motor gear 420 is connected to the drive shaft of the wheel motor 410 on the front side of the hole in the bracket 415.

As shown in FIG. 4B, teeth of the wheel motor gear 420 mesh with teeth of the basket gear 425, which is mounted to the back of the wheel basket 430. These gears operatively couple the wheel motor/encoder 410 to the wheel and allow the wheel rotation to be driven and tracked by the wheel motor/encoder 410. The basket gear 425 includes a central bearing installed over a hollow non-rotational shaft 470 that also serves to mount stationary light board 435 to the bracket 415. Basket gear 425 thus spins freely about the shaft 470. The basket gear 425 is coupled to the rear of wheel basket 430, allowing it to spin freely about the shaft as well. Power and control wires (not shown) extend from the controller to the light board 435 through the hollow shaft 470.

Referring back to FIG. 4A, it is desirable to keep the inertial load of the wheel low in order to eliminate as much latency in the control system as possible. Thus, the illustrated embodiment includes a light weight graphic film 440 for displaying graphics on the face of the wheel. The graphic film 440 is mounted to the front of the wheel basket 430 by the film locking ring 445. The illustrated configuration allows the wheel basket 430, the graphic film 440 and the film locking ring 445 to rotate when driven by the wheel motor 410 and the gears 420, 425. When the wheel is spinning, the light board 435 remains stationary in the space between the wheel basket 430 and the graphic film 440 and serves to backlight graphics displayed on the graphic film 440.

Returning to FIG. 4B, the annular ring 460, an annular gear assembly 450 and a turntable- or "Lazy Susan"-style bearing 480 are mounted to the housing 405. A ring motor/encoder 455, concealed by a pointer assembly 465, which also overlaps the front of the ring 460, is also mounted to the housing 405 by one or more brackets 485. Teeth on a ring motor gear 490 gear mounted to the drive shaft of the ring motor/encoder 455 interface with teeth on the gear assembly 450 to couple the ring motor/encoder 455 to the ring 460. Thus, the ring may be driven independently from the wheel via the ring motor 455 and its velocity and direction of rotation may be detected by the encoder portion of ring motor/encoder 455.

In accordance with one or more embodiments, the motion of the ring and the wheel may be coupled together by the controller using outputs to and inputs from their associated motor/encoders via a closed loop mechanism known as a PID control loop. Relative positions of the motors provided by the encoders are used to constantly adjust the motors' velocities according to the demands of the associated game logic. This practice also allows the control loop logic to adjust to changing loads such as friction, including the player attempting to slow or stop the rotation of the ring. The PID control loop reads the encoders positions and compares them to a previously read set of encoder positions. A desired motor speed, for each motor is then calculated using proportional, integral, and derivative responses, summing those three components to compute the output. Any slow-downs caused by outside forces on the ring are thus accounted for by the control loop logic. The control loop logic also provides information such as positional/velocity feedback and motor driver current to the game logic, which is then also able to monitor for tilt conditions, such as the player trying to stop the wheel via the ring. For example, if the player tries to slow down the wheel, current in the motor spikes and lags between the actual and expected positions and velocities become significantly large.

Figure 5:
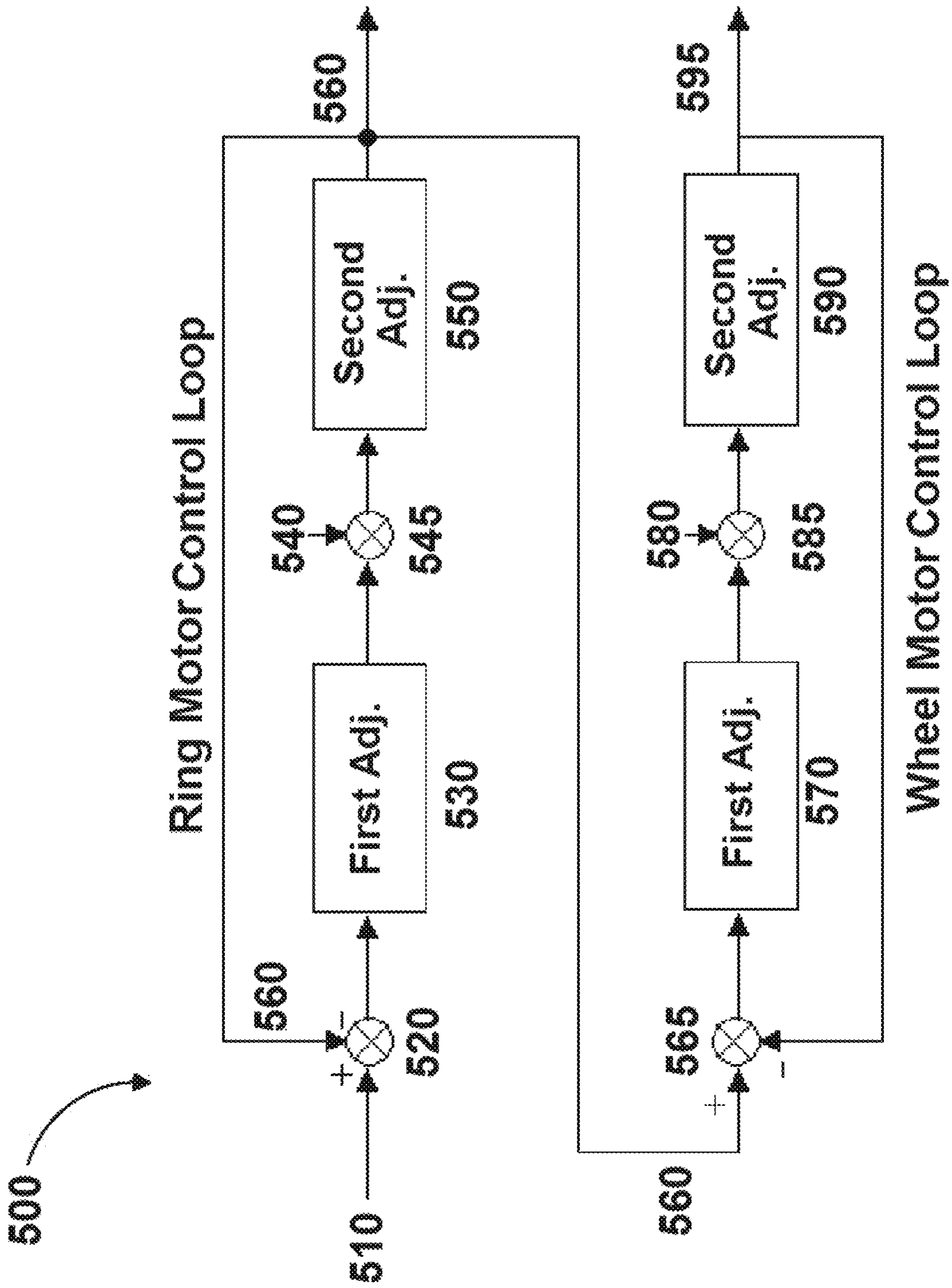
FIG. 5 illustrates the coupling of two motor control loops in accordance with one or more embodiments.

In accordance with one or more embodiments, and as illustrated by FIG. 5, the control loop may include a two-motor control loop arrangement 500 in which the actual ring velocity 560 serves as a velocity reference for the wheel motor so that any load disturbances applied to the ring are also transferred to the wheel and reflected in its rotation. In such an arrangement, the ring motor control loop acts as a master, wherein the wheel motor control loop acts as a slave. Two potential adjustments are made to the inputs to each of the motors. First, in the ring motor control loop, the target ring velocity 510 is applied to a first error detector 520 of the ring control loop logic. This error detector 520 compares the target ring velocity 510 to the actual ring velocity 560, as determined using ring encoder data, and a first portion of the loop controller logic 530 incrementally applies a positive or negative correction to a ring motor control input value from a previous iteration of the loop. Before applying the correction, however, a second error detector 545 of the control loop logic also considers any load disturbance 540 being applied to the ring and a second portion of the loop controller logic modifies the pending ring motor input accordingly. This final value is then input into the ring motor 550 and the actual ring velocity 560 is re-determined. The current ring velocity is then fed back into the loop for the ring motor at the first error detector 520, passed on to the game logic for its use and also passed to the wheel motor control loop as its input reference value.

Second, in the wheel motor control loop, the current ring velocity 560 is applied to a first error detector 565 of the wheel motor control loop logic as the target wheel velocity. This error detector 565 compares the target wheel velocity to the current wheel velocity 595, as determined using wheel encoder data, and incrementally applies a positive or negative correction to a previous wheel motor control input value from a previous iteration of the loop. Before applying the correction, however, a second error detector 585 of the wheel control loop logic also considers any load disturbance 580 being applied to the wheel and modifies the pending wheel motor input accordingly. This final value is then input into the wheel motor and the current wheel velocity 595 is determined. This velocity is fed back into the loop for the wheel motor and passed on to the game logic for its use. This allows for a tight synchronization of the entire system using two motors. In situations where the wheel is decoupled from the ring, the current ring velocity 560 is not applied as an input to the wheel motor control loop, which runs independently using target speed inputs provided by the controller as described below.

In one or more embodiments, the combined control loop logic controlling the motors may be in one of several exemplary states illustrated by Table 1.

TABLE 1

| |
|---|
| Idle: Nothing is happening. |
| Freewheel: Configures ring motor for free wheel. Must not be moving when entering this state. |
| Waiting for velocity trigger: In free wheel, waiting for user spin speed to exceed trigger threshold. |
| Ramping up: Spin was engaged by button, linearly ramps up velocity of ring and wheel until ring reaches trigger velocity. |
| Waiting for release: After velocity trigger, waits until a decrease in ring speed is detected. |
| Wait while speeding: If ring released and is over max speed, waits until slows down to max speed. |
| Moving: Wheel and ring motor velocities driven by spin curve. |
| Brake: Starts braking ring and wheel. |
| Lock Wheel: Wheel actively resists rotation. Used when racking win. |
| Tilted: Waiting for wheel spin to finish after a tilt. Ring decoupled from wheel. |

Figure 6:
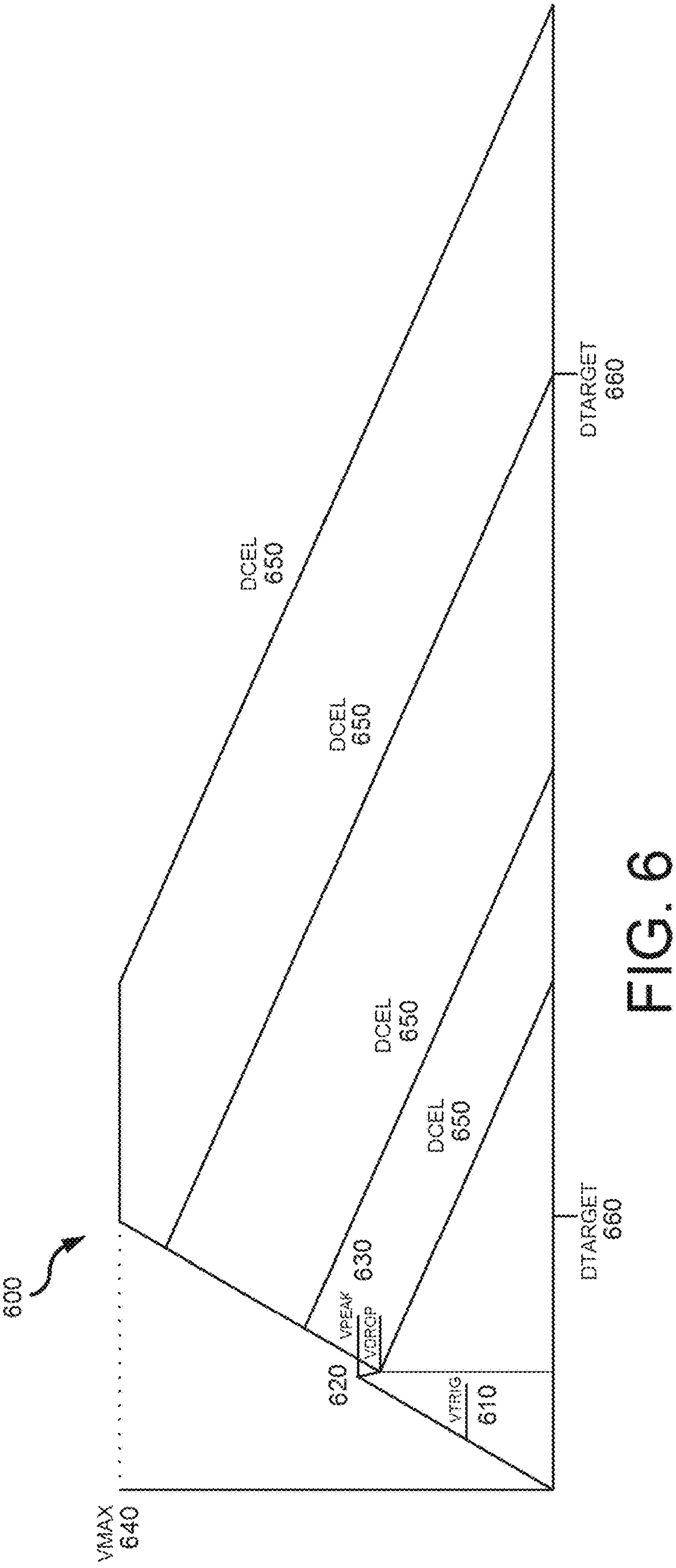
FIG. 6 is a state transition diagram in accordance with at least some aspects of the disclosed concepts.

FIG. 6, in accordance with one or more embodiments, provides a state transition diagram 600 illustrating possible transitions between the control loop states of Table 1. From an "idle" state, in which the wheel is not intended for use, the ring is enabled and the control loop logic enters a "freewheel" state, during which the player must spin the ring. Based on the encoder-derived velocity of the ring, motion of the ring is detected and the logic enters a "waiting for velocity trigger" state, where it remains until the velocity reaches at least a certain trigger velocity, VTRIG 610. The wheel motor is used to match the velocity of the ring.

Once a velocity of at least VTRIG 610 has been achieved, the logic enters a "waiting for release" state. The wheel motor is used to match the velocity of the ring. When the velocity drops by a defined VDROP 620 from a peak detected velocity VPEAK 630, the ring is deemed released and the logic enters a "moving" state, wherein the ring and wheel motors are driven to gradually carry the synchronized ring and mechanical wheel in a "braking state" to a desired wheel resting orientation by following a linear deceleration path DCEL 650 from the point of release to a final stop at the desired target DTARGET 660, at which point a "lock wheel" state is entered.

If, in the "waiting for release state," while waiting for the velocity to drop by VDROP 620, the ring instead achieves the maximum possible velocity, VMAX 640, the logic enters a "waiting while speeding" state wherein the ring is decoupled from the wheel and not driven by its motor and the wheel velocity is maintained until the ring slows to VMAX 640 or below, where the control loop logic then progressively enters the "moving," "braking" and "lock wheel" states as above.

In some embodiments, in lieu of the player spinning the wheel by engaging the ring, a "spin" button may instead be pressed. In this case, the logic enters a "ramping up" state, wherein the ring motor and wheel motors are used to drive the ring velocity to VTRIG 610, after which the logic then progressively enters the "moving," "braking" and "lock wheel" states as above.

Similarly, if the player attempts to interact with the ring once the logic has entered the "moving" state, the control loop logic (or associated game logic) registers a "tilt" and the ring is decoupled from the motion of the mechanical wheel in that the ring motor provides no resistance to the player and inputs from the ring are ignored. The mechanical wheel continues to follow the deceleration path DCEL 650 to the desired target DTARGET 660, whereupon the "lock wheel" state is then entered.

In one or more embodiments, the deceleration path DCEL 650 may be a nonlinear deceleration path. For example, the wheel may first quickly decelerate and then the slope of the deceleration may change so that the final few stops come in very slowly to build anticipation of the final result.

Once the activity involving the wheel is concluded, for example, when a game cycle or bonus game involving the wheel is completed, the control loop logic enters the "idle" state until the wheel is once again activated.

As described above, the player may use the ring to initiate a spin of the mechanical wheel in either direction. Once the ring reaches a qualifying velocity, the ring motor engages to continue the ring's spin and the wheel's motor is operated in a synchronized fashion to then decelerate to a predetermined wheel orientation with respect to the pointer. At any time during the spin, if the ring is impeded or stopped by the player, the ring motor may be effectively disengaged such that the mechanical wheel decouples and continues to spin under control of the wheel control loop until it stops in the predetermined orientation. However, in some embodiments, provided the ring is not slowed or stopped by the player, the player may provide one or more additional rotational inputs to increase the current speed of the wheel spin without decoupling the mechanical wheel from the ring. For example, as the wheel slows, the player may anticipate an undesired outcome and try to prolong the spin. In some embodiments, to provide additional entertainment value, the game may encourage the player to prolong the spin by providing a suggestion through text or audio messaging, for example, "You may wish to spin longer!" If the player provides additional rotational input in the direction of wheel travel, in effect, the control loop logic is returned to the "waiting for release state." Once the player releases the ring and its velocity drops, as described above, the control loop logic returns to the "moving" state and proceeds as described above. In most embodiments, prolonging the wheel spin will have no actual effect on the originally intended DTARGET 660.

Figure 7:
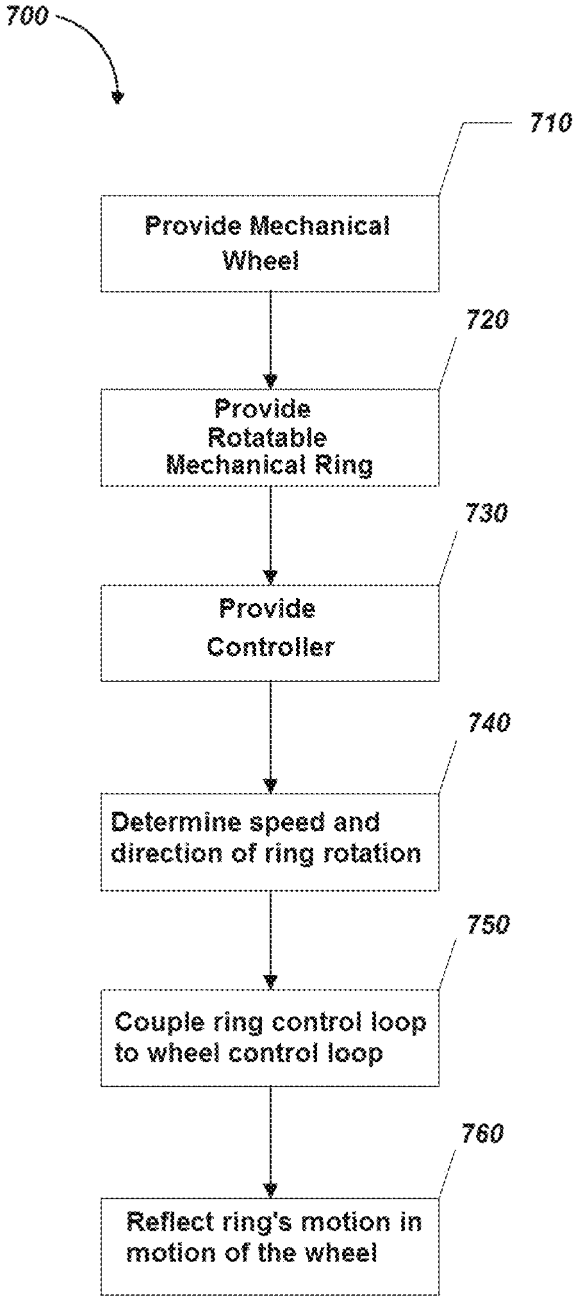
FIG. 7 is a flowchart for a method in accordance with at least some aspects of the disclosed concepts.

FIG. 7 represents an example of a method 700 to perform the above-described functions associated with the reflection the ring's in the motion of a mechanical wheel in accordance with one or more embodiments. In step 710, a mechanical wheel is provided. In step 720, a rotatable annular bezel ("ring"), is provided. hi step 730, a controller for executing the dual control loop logic described above is provided. In step 740, speed and direction of a rotation of the ring is determined. In step 750, the controller further monitors the rotation of the ring as described above and couples a control loop controlling the rotation of the wheel to a control loop associated with the rotation of the ring. In step 760, the ring's motion is thus reflected in the motion of the mechanical wheel.

While various embodiments have been described above, it should be understood that they have been presented by way of example only, and not limitation.

In accordance with one or more alternate embodiments, the ring may rotate freely and acts only as a triggering mechanism to initiate a wheel spin. As above, the physical wheel rotates in synchronization with the rotation of the ring until ring deceleration is detected, but, in place of ring motor/encoder 455, as shown in FIGS. 4A-4B, a velocity and direction encoder are employed. Wheel motor/encoder 410 still drives the wheel and its encoder tracks the position and velocity of the wheel. The use of data from both encoders allows the physical wheel to be rotated synchronously via the control loop until the ring encoder input indicates that ring deceleration is detected. Once deceleration is detected, indicating that the player has released the ring, the wheel's control is disconnected from inputs from the ring's encoder and the wheel's velocity is ramped down by the control loop using only the inputs from wheel motor/encoder 410 until the wheel stops at the predetermined stopping location.

In accordance with still other embodiments, the ring may be directly coupled with the wheel via a releasable clutch or releasable magnetic coupling connecting the inner surface of the ring with the outer surface of the wheel basket. When the ring is stationary or moving slowly, the clutch housing rotates along with the shaft and both the ring and the wheel are driven by the wheel motor control loop, as described above. When a predetermined ring velocity is reached or negative motor positional/velocity feedback and/or reverse motor drive current is detected, the clutch, controlled by a solenoid coupled to the controller, may disconnect the ring from the wheel. As above, the wheel's velocity then is ramped down by the wheel control loop until the wheel stops at the predetermined stopping orientation.

The clutch may, for example and without limitation, be a friction mount plate clutch or a shaft centrifugal clutch. In accordance with one or more embodiments, the clutch may be a magnetic clutch. For example, four to eight earth magnets may be positioned around the inner circumference of the ring. Ferrous metal blocks to mate with the magnets may be placed at corresponding locations on the wheel basket to couple the ring to the wheel magnetically. During rotation, if enough force is placed on the ring in the opposite direction of rotation, for example, in a "tilt" condition, the ring would decouple from the wheel, allowing the wheel to continue to its predetermined position under control of the wheel control loop, as above.

Figure 8:
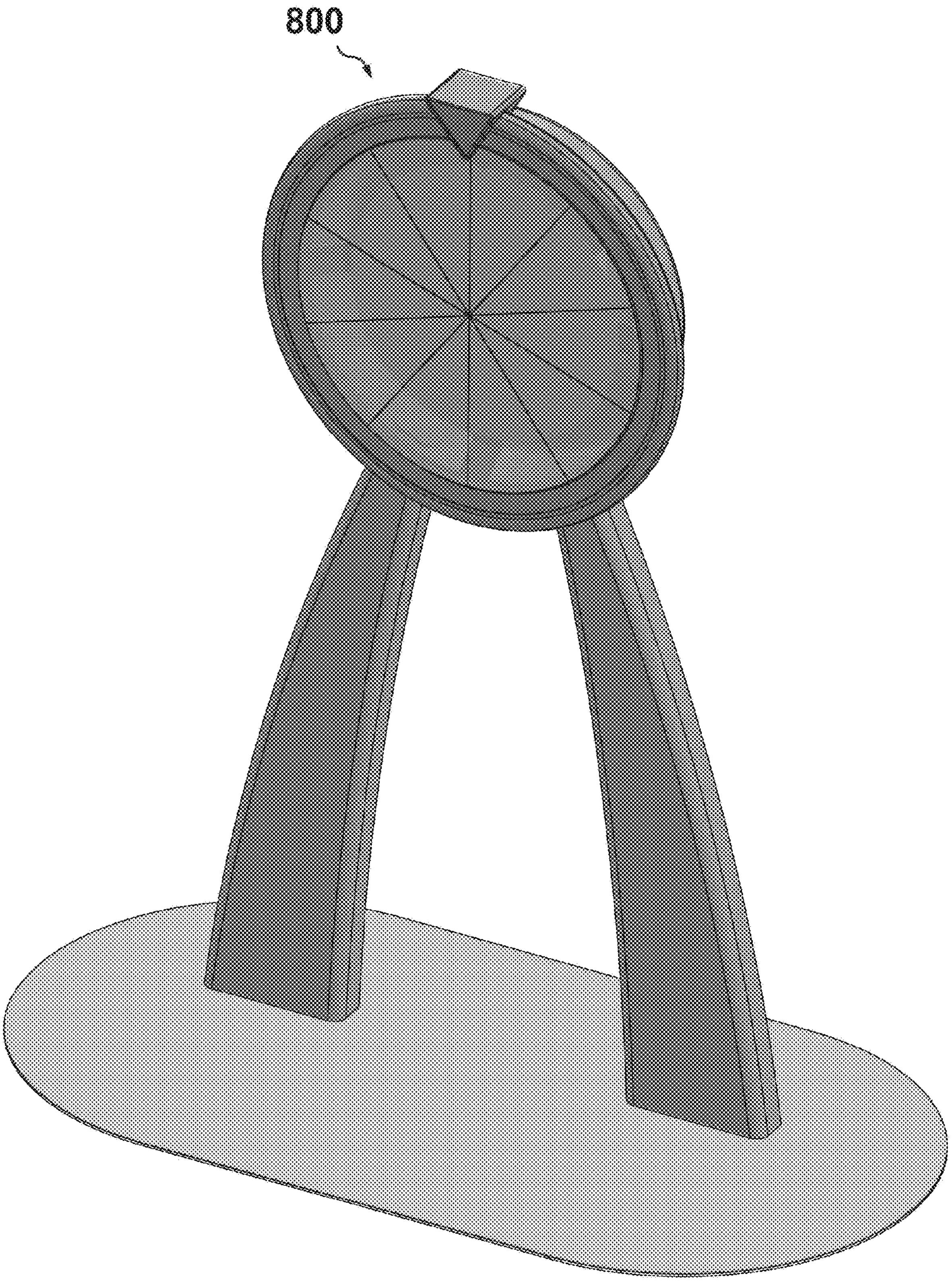
FIG. 8 is an isometric view of a free-standing mechanical wheel assembly in accordance with one or more embodiments.

While FIG. 1 illustrates the mechanical wheel display assembly integrated with a gaming machine, the mechanical wheel display assembly may be a separate free-standing unit 800, as shown in FIG. 8 in accordance with one or more embodiments, or may be mounted to a wall or, without limitation, any other suitable structure.

Thus, the breadth and scope of a disclosed embodiment should not be limited by any of the above-described exemplary embodiments, but should be defined only in accordance with the following claims and their equivalents.

What is claimed is:

1. A method comprising:

determining, via an electronic controller, a rotational motion of an annular rotatable bezel affixed relative to a rotatable wheel of a gaming machine, said bezel rotatable via manual player input to the bezel, wherein the determining the rotational motion is in response to the manual player input to the bezel; and directing, via the electronic controller, a rotational motion of the wheel in accordance with the determined rotational motion of the bezel.

2. The method of claim 1, wherein a bezel motor is coupled to the controller and to the bezel.

3. The method of claim 2, wherein the bezel motor is coupled to the bezel via one or more gears.

4. The method of claim 2, wherein the bezel motor provides resistance to the rotational motion of the bezel.

5. The method of claim 2, wherein the bezel motor is configured to lock to prevent rotation of the bezel, and wherein the controller is configured to unlock the bezel motor to enable the bezel to be rotated.

6. The method of claim 1, wherein the annular rotatable bezel is a mechanical bezel, wherein the rotatable wheel is a mechanical wheel, wherein the bezel and the wheel are coupled to a wheel assembly of the gaming machine, and said method further comprising directing the rotational motion of the wheel via a dynamic friction component of the wheel assembly.

7. The method of claim 1, wherein directing the rotational motion of the wheel in accordance with the determined rotational motion of the bezel comprises, upon detecting an end of the manual player input via the controller, decelerating, in a synchronized manner, the rotational motion of the bezel and the rotational motion of the wheel until the wheel reaches a target wheel position.

8. The method of claim 7, wherein the decelerating the rotational motion of the bezel and the rotational motion of the wheel is according to a predetermined deceleration profile.

9. The method of claim 8 further comprising:

increasing rotation of a wheel motor, coupled to the wheel and coupled to a bezel motor, to match a qualifying velocity in response to detection that the manual player input has ended, wherein the decelerating the rotational motion of the bezel and the rotational motion of the wheel comprises synchronously decelerating, by the controller via a brake according to the predetermined deceleration profile, a speed of the bezel motor and a speed of the wheel motor from the qualifying velocity to a zero velocity value when the wheel is at the target wheel position.

10. An apparatus comprising:

a rotatable wheel of a gaming machine;

a mechanical annular rotatable bezel overlaying at least a portion of the wheel, said bezel rotatable via manual player input to the bezel; and an electronic controller, coupled to the bezel, said controller configured to execute instructions that cause the apparatus to perform operations to determine a rotational motion of the bezel in response to the manual player input to the bezel, and direct rotation of the wheel in accordance with the determined rotational motion of the bezel.

11. The apparatus of claim 10, wherein the apparatus further comprises a bezel encoder coupled to the bezel, and wherein the controller is configured to determine the rotational motion of the bezel in response to signals generated by the bezel encoder according to the manual player input to the bezel.

12. The apparatus of claim 11, wherein the rotatable wheel is a mechanical wheel with a segmented rotatable wheel face, and wherein the controller is further coupled to the mechanical wheel.

13. The apparatus of claim 12, wherein the bezel is coupled to the wheel prior to determination of the rotational motion of the bezel, and wherein the bezel is configured to be decoupled from the wheel after the manual player input.

14. The apparatus of claim 10, wherein the controller is configured to determine a speed and direction of the rotational motion of the bezel, and wherein the controller is configured to direct the rotation of the wheel in accordance with the determined speed and direction.

15. The apparatus of claim 10 further comprising: a wheel motor and a wheel encoder each coupled to the controller and to the wheel, wherein the bezel is coupled to the wheel encoder.

16. The apparatus of claim 15, wherein the controller is further configured to adjust a speed of the wheel motor to match a rotational speed of the wheel to a rotational speed of the bezel via one or more control loops.

17. The apparatus of claim 16, wherein the controller is configured to detect an end of the manual player input, and, in response to the detection, control, via the one or more control loops, the rotational speed of the bezel and the rotational speed of the wheel according to a predetermined deceleration profile.

18. The apparatus of claim 16, wherein the one or more control loops comprise a bezel control loop and a wheel control loop, the bezel control loop and the wheel control loop logically coupled to match the rotational speed of the bezel and the rotational speed of the wheel, and wherein the bezel control loop provides input to the wheel control loop.

19. The apparatus of claim 18, wherein the controller is further configured to detect a tilt condition when the rotational motion of the bezel is externally slowed subsequent to the end of the manual player input, and wherein the controller is configured to, upon detection of the tilt condition, decouple the bezel control loop from the wheel control loop.

20. One or more non-transitory, machine readable mediums having instructions stored thereon, wherein when the instructions are executed by one or more electronic processors cause operations comprising:

determining, via an electronic controller, a rotational motion of an annular rotatable bezel affixed relative to a rotatable wheel of a gaming machine, said bezel rotatable via manual player input to the bezel, wherein the determining the rotational motion is in response to the manual player input to the bezel; and directing, via the electronic controller, a rotational motion of the wheel in accordance with the determined rotational motion of the bezel.

* * * * *